United States Patent Office 3,565,992
Patented Feb. 23, 1971

3,565,992
HALOGENATED IMIDAZOLE AND IMIDAZOLE SALTS USED FOR CONTROLLING INSECT AND HELMINTH PARASITES
Lisby L. Wade, Lake Jackson, and James F. Landram, Angleton, Tex., assignors to The Dow Chemical Company, Midland, Mich., a corporation of Delaware
No Drawing. Filed Mar. 8, 1968, Ser. No. 711,479
Int. Cl. A61k 27/00
U.S. Cl. 424—267
8 Claims

ABSTRACT OF THE DISCLOSURE

Disclosed are, halogenated imidazole compounds and salts thereof, compositions incorporating such compounds and salts, and methods utilizing such compounds, salts and compositions for parasite control, especially those which parasitize animals.

---

The present invention relates to animal husbandry and is particularly directed to methods and compounds (and compositions thereof) useful for controlling parasites which attack animals and to the improvement in the growth characteristics of such animals.

Domestic animals are subject to attack by a number of different parasites including fleas, flies, lice, ticks, screwworms and cattle grubs as well as the helminthic parasites such as lungworms, stomachworms and gastrointestinal worms.

The helminthic parasites include the strongyloids, cooperids and ascarids and are the causative agents of ascariasis, trichostrongylosis and gross parasitism. The helminths grow and mature in various organs but particularly the gastrointestinal tract of their host. In the usual life cycle, the ova pass out of the body with the fecal droppings, hatch and reach their infective stage, whereupon they are ingested during grazing, or as in the case with hookworms, enter the body through the skin.

In the case of ascarids, the swallowed eggs or larvae mature usually in the digestive tract. In other cases, the maturing proces may take place in other parts of the body such as the liver or the lungs as with lungworms.

These parasites during maturation and growth have a very deleterious effect upon the animal and its rate of growth. In the intestine, the parasites erode the epithelial tissues bringing about hemmorrhage, anemia, weakness and tissue necrosis. Animals, if they do not succumb to gross parasitism, exhibit the general characteristics of debilitation with attendant weakness, lowered vitality, and poor growth and reproduction. Needless to say, such effects are extremely undesirable, particularly when such affected animals are being raised for food or other markets.

One of the undesirable parasites in animals is the cattle grub which is the larval form of the heel fly (*Hypoderma lineatum*), the bomb fly (*Hypoderma bovis*) or the bot fly (*Dermatobia hominis*). The life cycle of these parasites is well documented, the migrating larvae, which hatch from eggs which have been laid and attached to the external surface of the host, feeding upon that host tissue which is adjacent its migratory path after penetration of the skin. Such tissue includes that of the esophageal region, the abdominal viscera, or spinal canal. Ultimately, these larvae locate in the skin, generally on the back of the host, through which they exit to advance pupation to the adult stage outside of the host's body. It is thus apparent that these organisms cause considerable damage to the carcass and hide of beef animals.

Yet another undesirable parasite is the screwworm fly (*Callitroga americana*) which necessarily breeds only in the tissues of living animals and in the advancement of its growth, exists upon wounded or diseased part of the host's body. Again, the debilitating effect resulting from the destruction of host animal tissue may immediately or ultimately kill the infested animals or at least retard or interfere with its growth and health to an extent sufficient to diminish its worth.

The treatment of these particular and other parasites which plague animals by presently employed methods has not been entirely satisfactory for several reasons. Some of the known materials have little effect, others are impractical because of the frequency of treatment required, and still others have an adverse effect upon the metabolism of the treated animal. Certain chemical compounds which are employed for the control of these parasites, notably the various phosphates and carbamates, are cholinesterase inhibitors. Because of this fact, repeated treatment with these compounds upon generations of parasites may eventually result in strains of these parasites which are resistant to the chemical effects. Thus being no longer effective, they rapidly fall into disuse. In view of these numerous developments, it is very desirable to obtain a simple, inexpensive, and effective method for the control of internal and external parasites in animals which would not suffer from the disadvantage of inducing side effects in the treated animal nor be susceptible to producing resistant strains of the parasitic targets.

The present invention is directed to such desirable features. It has now been discovered that by using and administering to animals certain halogenated imidazole derivatives or their amine salts or compositions thereof, good control of both the external and internal parasites which attack these animals is obtained. Examples of parasites which are controlled by this new method include cattle grubs, bots, screwworms, ticks, lice, fleas, mites, helminths and other internal parasites, and flies. These compounds are readily assimilable and, when used in proper dosages, are nontoxic to the host animals. Further, they are not cholinesterase inhibitors and thus do not suffer from potential short term effectiveness.

In accordance herewith, parasite control is accomplished upon administering to animals a parasiticidal dosage of an imidazole compound of the formula:

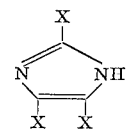

wherein each X is bromo or chloro and the corresponding amine salts thereof, the amine selected from the group consisting of alkylamine, cyclohexylamine, and piperidine.

By the term "alkylamine" is intended a monoalkylamine or dialkylamine, the alkyl group in each instance bearing from 1 to 12 carbon atoms, inclusive. These alkyl groups are saturated hydrocarbon groups and include the various geometric isomers. Examples thus are methyl, ethyl, propyl, isopropyl, n-butyl, s-butyl, isobutyl, t-butyl, n-pentyl, isopentyl, hexyl, 3-methylpentyl, octyl, nonyl, dodecyl, and so forth.

Thus included within the scope of the useful compounds of the present invention are the imidazoles which contain three bromine or chlorine atoms as well as the alkylamine, cyclohexylamine, and piperidine amine salts thereof which salts are the products of the parent halogenated imidazole compound and the corresponding amine compound as defined above. Representative examples of the useful compounds hereof include tribromoimidazole, trichloroimidazole and the methylamine, ethylamine, isopropylamine, diethylamine, isobutylamine, diisobutylamine, diisopentylamine, hexylamine, octylamine, n- dodecylamine, cyclohexylamine, and piperidine salts of these two compounds, and the like. The amines used in preparing the salts hereof are known and readily available materials.

The halogenated imidazoles and their amine salts hereof are known or can be prepared via known procedures such as that set forth by Hofmann, Imidazole and Its Derivatives; Interscience Publishers, Inc., New York; 1953.

In the practice of the present invention the imidazole compounds or compositions thereof are orally administered to the animals such as via regular food consumption or via acute oral administration. Alternatively, administration can be made by spraying the animals with or dipping them in a composition containing the active compound which permits absorption through the skin or by injecting the animal with a suitable amount of the active compound.

The exact dosage to be administered is variable, being dependent primarily upon the type and nature of the parasite to be controlled and its degree or severity of development, the manner of administration of the active compound hereof and the particular one employed, as well as the type and nature of host animal species and the response desired. For example, when used to control internal and external parasites in sheep the active compounds hereof are effective in dosages ranging from about 10 to about 100 milligrams per kilogram of body weight. Similarly, single dosages of up to about 50 milligrams per kilogram of body weight in cattle is effective for the control of the growth of parasites. The preferred dose in cattle range from 10 to 25 milligrams per kilogram of body weight. In dogs, up to about 25 milligrams per kilogram of body weight in single dosage units produce effective results. If desired, the compounds hereof may be administered in multiple doses over a period of days. In such operations, it is preferred to employ a daily dosage ranging from 0.01 to about 10 milligrams per kilogram of body weight of the host animal.

As mentioned, the process of the present invention can be carried out in one manner by the subcutaneous injection of a halogenated imidazole derivative or its amine salts in a suitable carrier. By suitable carrier is meant an inert, liquid carrier which will not bring about degradation of the halogenated imidazole derivative or its amine salts and, further, will not irritate or adversely affect the animal to be treated. Suitable carriers are well known in the art and include diethyl succinate, ethyl acetate, propylene glycol, ethyl lactate, diethyl adipate, peanut oil, and sesame oil.

Alternatively, the method of the present invention can be carried out by the oral administration or feeding of the unmodified halogenated imidazole derivative or its amine salts. In such usage, the compounds may be modified with one or a plurality of additaments or innocuous ingestible adjuvants such as water, ethanol, skimmed milk, syrups, edible oils, surface active dispersing agents such as the liquid and solid dispersing or emulsifying agents, and edible solid carriers such as edible powders, mineral and vitamin supplements and commercial feeds, concentrates, mashes, bolus, and supplements.

The present invention also embraces the employment of a liquid drench or external powder, containing the halogenated imidazole derivative or its amine salts. The compounds can also be administered as a spray, preferably in a non-aqueous medium such as an isoparaffin oil. Other liquid mediums oftentimes used for animal sprays such as kerosene, diesel fuel, as well as aqueous spray compositions wherein the halogenated imidazole derivative or its amine salts are dispersed with a suitable surface active dispersing agent, can also be employed.

Such augmented compositions are adapted to be administered to animals to supply the desired dose of active agent or to be employed as concentrates and subsequently diluted with additional carrier to produce the ultimate compositions. In the modified compositions, the carrier advantageously cooperates with the active ingredient thereby contributing to the usefulness and effectiveness of the invention.

The exact concentration of the halogenated imidazole derivative or its amine salts to be employed in the compositions may vary provided that sufficient amount of the composition is administered to the animal so as to provide the required dosage of active agent. For example, where direct administration by intramuscular injection is to be employed, it is generally desirable that the ingestible solution contain a fairly high concentration of the active agent. In such operations, a liquid composition containing from 35 to 60 percent by weight of the agent is usually considered most practicable. Where direct oral administration to an animal is to be employed, liquid or solid compositions containing from 1 to 95 percent by weight of the halogenated imidazole derivative or its amine salts can be employed to supply the desired dosage. Where the compounds are provided as a constituent of the principal food ration, satisfactory results are obtained with food rations containing a minor but effective amount of the halogenated imidazole derivative or its amine salts. The exact amount of the compound to be incorporated in the ration is dependent upon the food consumption and feeding habits of the animals concerned. In animals such as goats, swine, sheep, horses and cows, the required dosage can be supplied with feed compositions containing from 0.001 to 1 percent by weight of active agent. Where the compound is provided as a constituent of feed supplements, good results are obtained with supplements containing from 0.1 to 5 percent by weight of the halogenated imidazole derivative or its amine salts. In compositions to be employed as concentrates, the active agents can be present in a concentration of from 2 to 98 percent by weight.

Liquid compositions containing the desired amount of the halogenated imidazole derivative or its amine salts can be prepared by dissolving the compounds in ethanol or an edible oil or by dispersing them in water with the aid of a suitable surface active dispersing agent such as an ionic or non-ionic emulsifying and dispersing agent. Suitable surface active agents include the glycerol and sorbitan esters of fatty acids and the polyoxyalkylene derivatives of fatty alcohols and sorbitan esters. The aqueous compositions can contain one or more water-immiscible oils as a solvent for the active agent. In such compositions, the water, oil, and emulsifying agent constitute an aqueous emulsion carrier.

In the preparation of solid feed compositions, the halogenated imidazole derivative or its amine salts can be mechanically mixed with a finely divided edible solid such as flour or animal feed or a solid surface active dispersing agent such as finely divided bentonite, fuller's earth or attapulgite. These compositions can be administered in the form of bolus, capsule or tablet, or dispersed in an animal feed and such feed used to supply a part or the entire food ration. Alternatively, the halogenated imidazole derivative or its amine salts can be dissolved in an organic solvent, the resulting mixture dispersed in an animal feed and the feed dried to remove the solvent.

Also, the compounds can be dispersed in an edible oil such as coconut oil, olive or peanut oil and the resulting mixture dispersed in the feed. These edible oil compositions can contain one of the aforementioned surface active agents.

Since many of the parasites are seasonal in their appearance, the present invention is advantageously practiced with certain parasites at a particular time of the year. Thus, with cattle grubs, *Hypoderma lineatum,* and *bovis,* it is preferred that the administration for their control be carried out in the fall and quite soon after the disappearance of the heel and bomb flies. The disappearance of these flies varies somewhat depending upon

EXAMPLE 1

A sheep which is voiding an average of 1,180 ova of gastro intestinal parasites per gram of feces is orally administered geltin capsules so as to receive a dose of 25 milligrams per kilogram of body weight of the cyclohexylamine salt of 2,4,5-tribromoimidazole. The voided ova include those of Bunastomum spp., Oesophagostomum spp., Ostertagi spp., Trichostrongulus spp., and Cooperia spp. One week following such treatment the feces are examined and the average voided ova count found to be reduced by 92 percent.

In a concurrently conducted check experiment with a second similarly infested sheep which is not treated with the active compound, no reduction of the gastrointestinal parasites is observed.

EXAMPLE 2

The sheep which is dosed as described in Example 1 above is further examined as follows. Three hours after the treatment of the sheep with the active compound, 5 cubic centimeters of blood are removed from the sheep and fed to starved stable flies. Within 24 hours after feeding, it is observed and recorded that all of the stable flies are killed by this treatment.

EXAMPLE 3

The procedure described in Example 2 is repeated except that the sheep is dosed in the amount of 10 milligrams per kilogram of body weight. Again, a 100 percent mortality is observed and recorded for all of the flies consuming the blood removed from the sheep post treatment.

EXAMPLE 4

Two procedures exactly similar to those described in the foregoing two examples are separately conducted administering, in the first, 10 milligrams per kilogram of body weight of 2,4,5-trichloroimidazole and, in the second, 25 milligrams per kilogram of body weight of the dodecylamine salt of 2,4,5-tribromoimidazole, respectively. In each instance, a 100 percent mortality is observed and recorded for stable flies which are fed on the blood of the treated animals.

EXAMPLE 5

Four calves are each administered a dosage of 50 milligrams per kilogram of body weight of 2,4,5-tribromoimidazole as a pour-on treatment in a solution containing the appropriate quantity of the active component, the remainder consisting of 80 percent castor oil and 20 percent isopropanol. These calves are heavily infested with cattle grubs (*Hypoderma lineatum*). At the time of treatment, the backs of the calves are found to have a number of nodular dermal cysts harboring live cattle grub larvae. Examination of the calves over a two month period following the administration of the 2,4,5-tribromoimidazole shows a 94 percent reduction in the amount of cattle grubs.

Similarly, calves are maintained under exactly the same conditions but are not administered the 2,4,5-tribromoimidazole. These calves are similarly heavily infested with cattle grubs. At the end of the two month period it is found that the latter calves remain heavily infested with cattle grubs and appear to be in a debilitated state of health.

EXAMPLE 6

A dog which is heavily infested with fleas and brown dog ticks is orally administered, via gelatin capsules, a dose of 25 milligrams per kilogram of body weight of the cyclohexylamine salt of 2,4,5-tribromoimidazole. It is examined 24 hours post treatment, and all the infesting ticks and fleas are dead.

EXAMPLE 7

In another representative operation, a sheep is intramuscularly injected with a solution containing 50 milligrams of the diisobutylamine salt of 2,4,5-tribromoimidazole per 100 milliliters of ultimate mixture. The other component of such composition is a 50:50 mixture of propylene glycol and ethanol. The amount of composition employed is sufficient to supply a dosage of 25 milligrams of the 2,4,5-tribromoimidazole per kilogram of body weight. Prior to treatment, the sheep is voiding large numbers of the ova of various gastrointestinal parasites, including those of Bunastomum sp., Oesophagostomum sp., Ostertagi sp., Trichostrongulus sp. and Cooperia sp. At regular intervals, the treated sheep feces are examined for numbers of internal parasite ova present and it is found that such have been reduced by 95 percent.

A simultaneous check results in continued high gastrointestinal parasite infestation for untreated sheep.

EXAMPLE 8

2,4,5-tribromoimidazole is employed for the control of screwworms which are infesting a wound in the area of the neck of a calf. The imidazole compound is administered intramuscularly as described in the foregoing example in an amount sufficient to provide a dosage of 25 milligrams per kilogram of body weight. Examination of the wound 24 hours following treatment shows a 100 percent kill of screwworms and a marked healing, with the wound scabbed over and of reduced size. Following the administration, there is observed no adverse effects upon the calf which could be attributable to the treatment of the imidazole compound.

EXAMPLE 9

Three ingestible solutions are prepared, one containing 2,4,5-tribromoimidazole, the second piperidine salt of 2,4,5-tribromoimidazole and the third diethylamine salt of 2,4,5-tribromoimidazole. In each the imidazole compound is dissolved in diethyl succinate to provide a concentration of 500 milligrams of imidazole per liter of solution. A portion of these compositions are separately injected intramuscularly into the hips of three sheep such that each sheep receives a dosage of 25 milligrams per kilogram of body weight of one of the compounds.

One hour after administration, stable flies are allowed to feed on the skin of the animals for a period of 15 minutes and thereafter caged and observed for 24 hours for mortality of the flies. As a result of these operations, a substantially complete kill of stable flies feeding on each of the sheep dosed with the imidazole compounds is obtained. Following the treatment, no adverse effect on the sheep attributable to the imidazole compound is observed.

EXAMPLE 10

The imidazole derivatives as set forth in the preceding examples and the piperidine salt of 2,4,5-tribromoimidazole, the piperidine salt of 2,4,5-trichloroimidazole, the octyl amine salt of 2,4,5-trichloroimidazole, the diisopentylamine salt of 2,4,5-tribromoimidazole, and the nonylamine salt of 2,4,5-trichloroimidazole are each separately mixed and mechanically ground with kaolin clay, diatomaceous earth (Daxad No. 27) and Nekal A to prepare concentrate compositions. In such operations, 25 parts by weight of imidazole compound is employed with 44 parts of kaolin clay, 28 parts of diatomaceous earth, 2 parts of a polymerized sodium salt of a substituted benzoid alkyl sulfuric acid (Daxad No. 27) and 1 part of sodium naphthalene sulfonate (Nekal A).

Portions of each of these concentrate compositions are dispersed in water to prepare aqueous drench compositions containing 0.5 percent by weight of one of the imidazole compounds. These drench compositions are orally administered to calves in the late fall soon after the heel and bot flies have deposited eggs and are found subsequently to give good controls of cattle grubs in the treated animals.

What is claimed is:

1. A method for treating domestic animals for the control of insect and helminth parasites which attack these animals, said method comprises administering to said animals, to control said parasites, a parasiticidal dosage of an imidazol compound of the formula

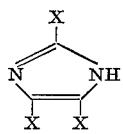

and the corresponding amine salts thereof, wherein each X is bromo or chloro and said amine salt is selected from the group consisting of the alkylamine salt, the cyclohexylamine salt and the piperidine salt.

2. The method according to claim 1 wherein said alkylamine is a monoalkylamine or dialkylamine, the alkyl group containing from 1 to 12 carbon atoms.

3. The method according to claim 1 wherein the imidazole compound is 2,4,5-tribromoimidazole.

4. The method according to claim 1 wherein the imidazole compound is 2,4,5-trichloroimidazole.

5. The method according to claim 1 wherein the imidazole compound is the cyclohexylamine salt of 2,4,5-tribromoimidazole.

6. The method according to claim 1 wherein the imidazole compound is the diisobutylamine salt of 2,4,5-tribromoimidazole.

7. The method according to claim 1 wherein the imidazole compound is the dodecylamine salt of 2,4,5-tribromoimidazole.

8. The method according to claim 1 wherein the imidazole compound is the piperidine salt of 2,4,5-tribromoimidazole.

References Cited

UNITED STATES PATENTS 3,409,606 11/1968 Lutz et al. _____ 260—157
3,423,420 1/1969 Buchel et al. _____ 260—309

FOREIGN PATENTS 6510168 2/1966 Netherlands _____ 71—92

OTHER REFERENCES

Lutz et al., J. of Heterocyclic Chem., vol. 4 (3), September, 1967 (pp. 399–402).

SAM ROSEN, Primary Examiner

U.S. Cl. X.R.

424—273